(12) United States Patent (10) Patent No.: US 9,863,317 B2
Santini et al. (45) Date of Patent: Jan. 9, 2018

(54) FILTERING CHAMBER AND METHOD FOR MAINTAINING SAME

(76) Inventors: Marco Santini, Florence (IT); Giorgio Marchetti, Porto Recanati (IT)

( * ) Notice: Subject to any disclaimer, the term of this patent is extended or adjusted under 35 U.S.C. 154(b) by 1235 days.

(21) Appl. No.: 14/415,410

(22) PCT Filed: Dec. 20, 2011

(86) PCT No.: PCT/EP2011/073332
§ 371 (c)(1),
(2), (4) Date: Apr. 8, 2015

(87) PCT Pub. No.: WO2012/084892
PCT Pub. Date: Jun. 28, 2012

(65) Prior Publication Data
US 2015/0219010 A1 Aug. 6, 2015

(30) Foreign Application Priority Data
Dec. 23, 2010 (IT) .............................. CO2010A0068

(51) Int. Cl.
*F02G 3/00* (2006.01)
*F02C 7/05* (2006.01)
*F01D 25/00* (2006.01)
*F01D 25/32* (2006.01)
*F02C 7/055* (2006.01)
*B01D 46/00* (2006.01)
*B01D 46/42* (2006.01)

(52) U.S. Cl.
CPC ............ *F02C 7/05* (2013.01); *B01D 46/0087* (2013.01); *B01D 46/4227* (2013.01); *F01D 25/002* (2013.01); *F01D 25/32* (2013.01); *F02C 7/055* (2013.01); *Y10T 29/49238* (2015.01)

(58) Field of Classification Search
CPC .......... F01D 25/002; F01D 25/32; F02C 7/05; B01D 46/0087; B01D 46/4227
USPC ...................................................... 60/39.092
See application file for complete search history.

(56) References Cited

U.S. PATENT DOCUMENTS

| 3,402,530 | A | 9/1968 | Agnon |
| 4,502,874 | A | 3/1985 | Levie et al. |
| 4,895,581 | A | 1/1990 | Starling |

(Continued)

FOREIGN PATENT DOCUMENTS

| EP | 2146098 A2 | 1/2010 |
| EP | 2199571 A2 | 6/2010 |

(Continued)

OTHER PUBLICATIONS

International Search Report and Written Opinion dated Jan. 31, 2012 which was issued in connection with PCT Patent Application No. EP11/073332 which was filed on Dec. 20, 2011.

(Continued)

*Primary Examiner* — Jason Shanske
(74) *Attorney, Agent, or Firm* — GE Global Patent Operation

(57) ABSTRACT

A filtering chamber for a gas turbine having a combustor, compressor and air inlet duct, and a corresponding maintenance method is described. The filtering chamber includes a first chamber in an inlet plenum; a second chamber in the inlet plenum; and an air bypass mechanism configured to reduce a pressure difference across a final filter that separates the first chamber from the second chamber.

11 Claims, 16 Drawing Sheets

(56) References Cited

U.S. PATENT DOCUMENTS

| | | | |
|---|---|---|---|
| 6,082,094 A | 7/2000 | Longardner et al. | |
| 6,123,751 A | 9/2000 | Nelson et al. | |
| 6,348,085 B1 | 2/2002 | Tokar et al. | |
| 6,766,636 B2 | 7/2004 | Shingu et al. | |
| 7,028,485 B1 | 4/2006 | Mee | |
| 7,051,534 B2 | 5/2006 | Sandberg et al. | |
| 7,297,173 B2 | 11/2007 | Renwart et al. | |
| 7,648,564 B2 * | 1/2010 | Chillar | F02C 7/04 55/312 |
| 8,234,874 B2 * | 8/2012 | Upadhyay | B01D 46/42 55/314 |
| 8,349,045 B2 * | 1/2013 | Jarrier | F02C 7/052 454/275 |
| 2003/0177755 A1 | 9/2003 | Shingu et al. | |
| 2004/0226443 A1 | 11/2004 | Gillingham et al. | |
| 2010/0037777 A1 | 2/2010 | Davis et al. | |
| 2010/0175389 A1 | 7/2010 | Janawitz et al. | |

FOREIGN PATENT DOCUMENTS

| | | |
|---|---|---|
| JP | 11324708 A | 11/1999 |
| JP | 2004124764 A | 4/2004 |
| JP | 2004169667 A | 6/2004 |
| JP | 2006009591 A | 1/2006 |
| JP | 2008184982 A | 8/2008 |
| JP | 4203449 B2 | 1/2009 |
| WO | 2004033873 A1 | 4/2004 |
| WO | 2008061686 A1 | 5/2008 |
| WO | 2008072260 A1 | 6/2008 |
| WO | 2009088277 A1 | 7/2009 |

OTHER PUBLICATIONS

Italian Search Report and Written Opinion dated Oct. 24, 2011 which was issued in connection with Italian Patent Application No. CO2010A000068 which was filed Dec. 23, 2010.

Wilcox et. al.: "Guideline For Gas Turbine Inlet Air Filtration Systems", Gas Machinery Research Council Southwest Research Institute®, Apr. 2010.

Donle et. al.: "Gas Turbine Inlet Air Treatment: A New Technology", Presented at the International Gas Turbine and Aeroengine Congress and Exposition Cincinnati, Ohio May 1993.

Loud et. al.: "Gas Turbine Inlet Air Treatment"; GE Power Generation, 1991.

* cited by examiner

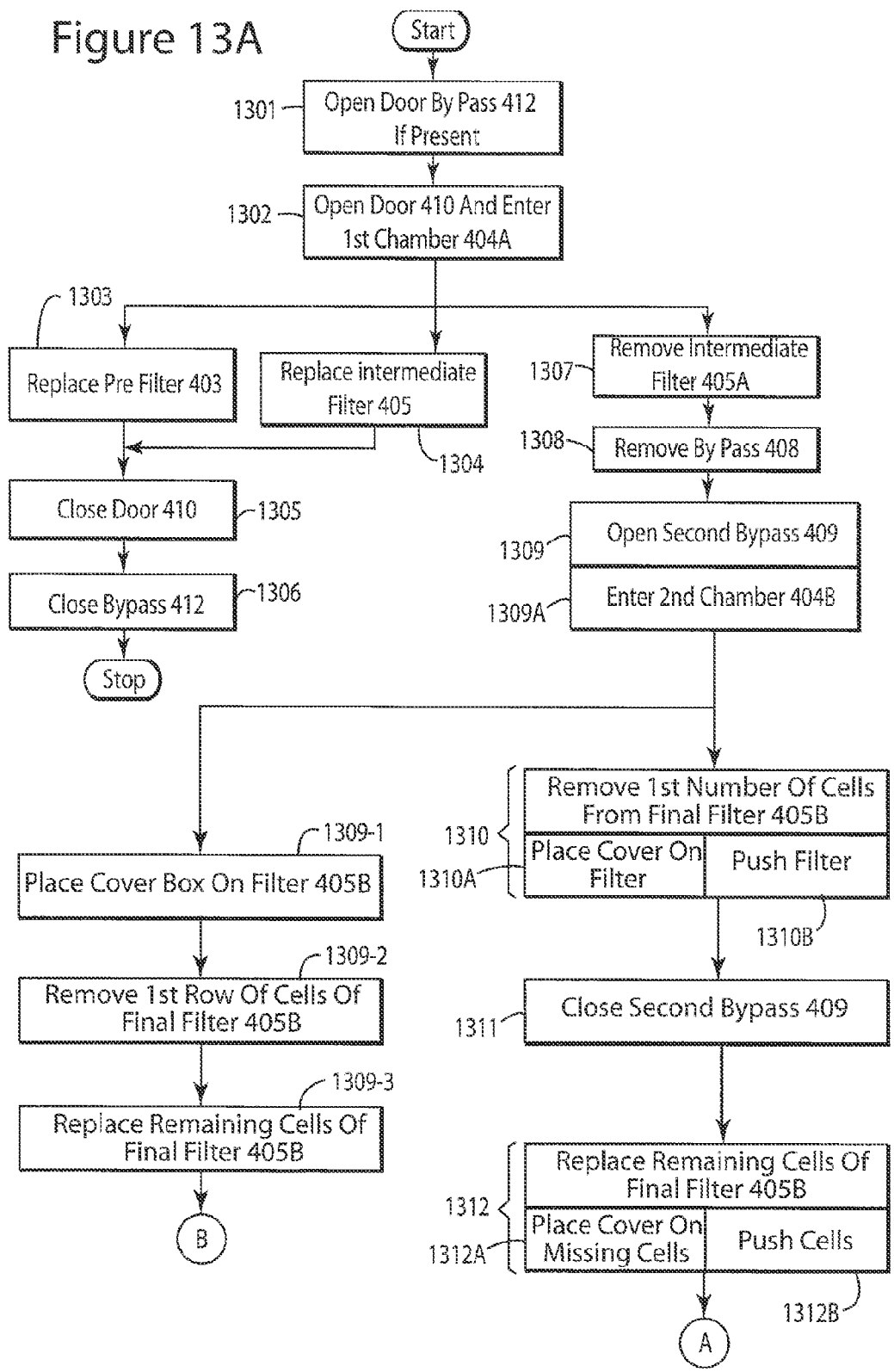

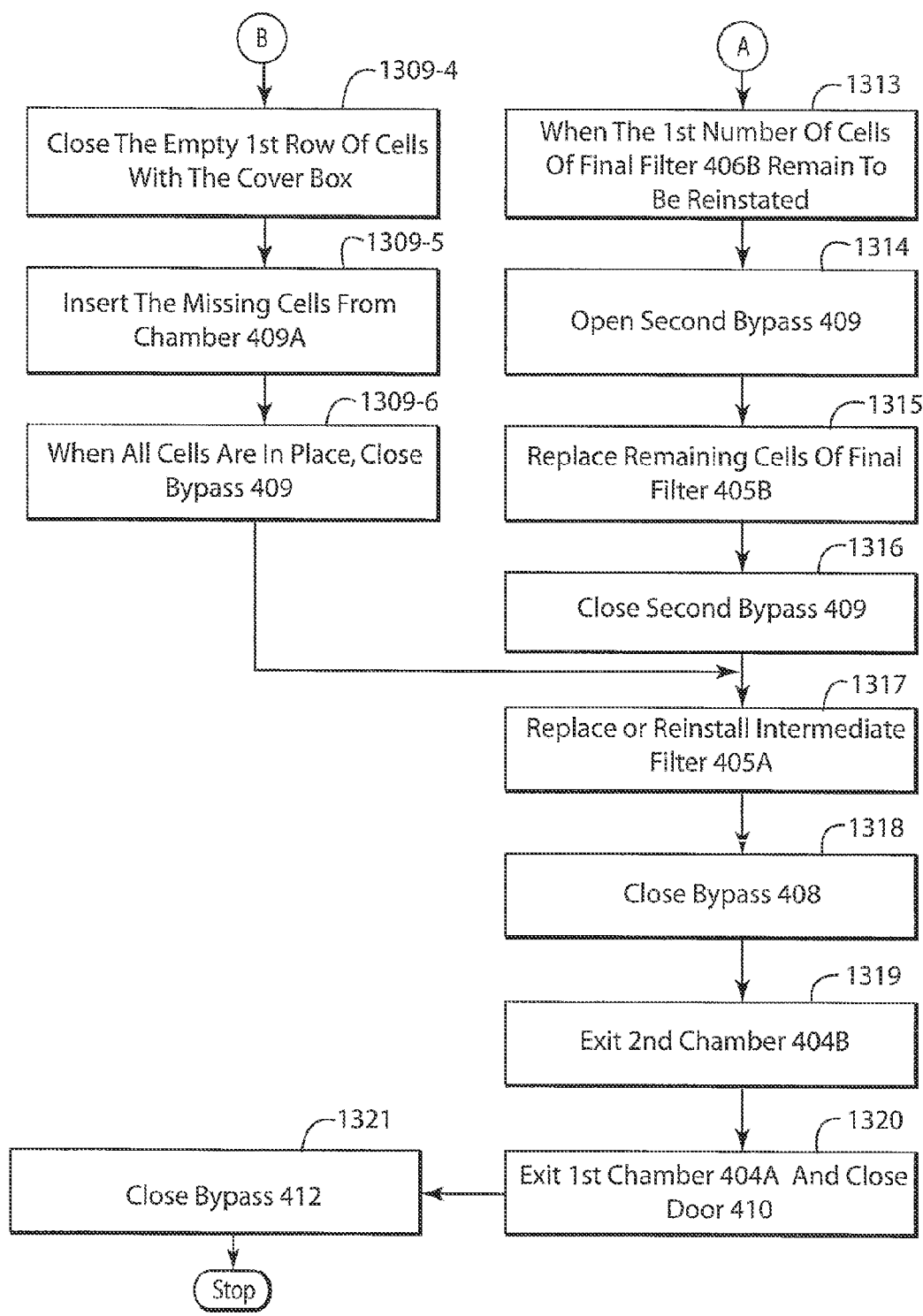

FILTERING CHAMBER AND METHOD FOR MAINTAINING SAME

BACKGROUND OF THE INVENTION

Technical Field

The present disclosure relates to filtering chambers and methods for maintaining said filtering chambers.

Discussion of the Background Art

Turbomachines (compressors, gas turbines, mechanical and generator drives, pumps, etc.) operate in some of the world's most severe environments. Even when not operating in polluted environments, these machines require a clean intake of air. For this reason, an air intake needs to be cleaned before being provided to the machines or otherwise the impurities in the air intake may damage the compressor and/or can lead to heavy fouling of the compressor, causing the compressor to loose efficiency. Various approaches may be used to clean the air intake. One such approach is to install one or more filters at the intake of the turbomachine.

A conventional filtering approach includes using a prefilter in order to extend the life of the additional stages installed downstream by removing the coarse part of solid contaminants. In a multistage arrangement, the efficiency class of the prefilter should be no more than three (3) classes lower than the efficiency class of any filter element installed downstream. Thus, when the efficiency class of the last filter stage reaches EPA (E10 or above) or HEPA (H13 or above) levels, an "intermediate" filter stage shall be provided.

Another conventional filtering approach includes using an "Intermediate" high efficiency filter stage type (generally F8 or F9 efficiency class rated) to extend the life of any final filter stage installed downstream. Also if the final stage is an F class rated stage, an intermediate fine filter stage may be used to extend the life of the final stage filter element.

Another conventional filtering approach includes using a "Final" filter stage. Depending on the level of contaminants expected and or the desired downstream purity level, the conventional final filter stage may reach EPA (E10 or above) or HEPA (H13 or above) efficiency classes.

Conventional multistage air filtration systems are designed to allow the replacement of prefilters (and intermediate filters) while the turbomachine, e.g., gas turbine is running. However, the existing systems do not allow for replacement of the high efficiency final stage filters (which might be EPA or HEPA filters) under safe conditions for the gas turbine. Therefore, in the conventional systems and methods for replacing the high efficiency final stage filter, the turbomachine (e.g., a gas turbine) must be shut down. Shutting down a gas turbine is expensive and undesirable as the cost of an inactive gas turbine is up to millions of dollars per day.

FIG. 1 is a basic diagram of a gas turbine system 100. This system 100 includes, inter alia, a compressor 102 that compresses air taken at an inlet 104. The compressed air is provided to a single or multiple combustor 106 together with fuel from a supply 108. After burning the fuel and the air, the hot gases are provided to a turbine 110 for transforming the heat into mechanical energy. The air inlet 104 of the compressor brings in external air via an air filtration system (e.g., a filter house). The filters in the filter house are used to prevent foreign material in the air stream from entering into the compressor or components downstream from the compressor, as such foreign material may damage these components or foul the compressors or fans.

FIGS. 2A-2C are block diagrams of single, double and triple stage filter systems that may be in typical filter house. Each of these filter systems include a weather protection system 201A, 201B, 201C on an exterior wall. In the single stage filter system (e.g., pulse jet type filter system or self cleaning filter system), air passes through one or more fine (particulate) filter assemblies 202A. In the double and triple stage filter systems, air passes through one or more pre-filter assemblies 203B, 203C before reaching the fine filter assemblies 202B, 202C. In the triple stage system shown in FIG. 2C, one or more high efficiency particulate air (e.g., F class, EPA or HEPA) filter assemblies 204C may be installed after the corresponding one or more fine filter assemblies 202B. Access to the filters shown in FIGS. 2A-2C is via a door or another access port 205A, 205B, 205C. For filter systems of more than one floor, access doors at corresponding maintenance levels may be used.

One or more of the filters shown in FIGS. 2A-2C must be cleaned or replaced according to a maintenance schedule, or as circumstances dictate. However, cleaning or replacement may require shutting down the gas turbine to prevent foreign material in the air stream from entering into the compressor. This results in large operational costs (losses) due to the fact that the gas turbine is not operating. A guard filter is generally designed to capture items larger that particulate matter (e.g., tools, screws, etc.) or agglomerated contaminants (e.g., debris from dust caking of a self-cleaning filter element) from being sucked into the compressor during maintenance on the other filters.

FIG. 3A shows a single stage filter system with a guard filter 301A located behind a corresponding prefilter 302A. Access to the guard filter 301A and to a backside of the filter 302A is via a door or other access port 304A located between the filter 302A and the guard filter 301A. Access to a front side of the filter 302A is via a second door 305A. In some configurations, door 305A may not be present.

FIG. 3B shows a double stage filter with the guard filter 301B mounted behind an intermediate (e.g., fine or high efficiency) filter 302B. Access to the prefilter 303B and intermediate filter 302B is via a door or other access port 304B located between the prefilter 303B and the intermediate filter 302B. Access to the guard filter 301B is possible after removing the intermediate filter 302B.

However, the related art does not address triple stage filters, which require large suction forces to be applied to extract the final stage (it might be an EPA or HEPA) filter elements out from their filter frame due to the differential pressures associated with this filter stage. Thus, what is desired, as discovered by the present inventors, is a system and method for maintenance of all the three filter stages, in the presence of the large suction forces.

SUMMARY OF THE INVENTION

According to an exemplary embodiment, there is a filtering chamber configured to provide air to an inlet of a compressor. The filtering chamber includes a first chamber in an inlet plenum having a first door and a prefilter installed in an intake port, the intake port being connected to an exterior of the filtering chamber; a second chamber in the inlet plenum, the second chamber being separated by a intermediate filter and a final filter from the first chamber and having a second door; and an air bypass mechanism configured to reduce a pressure difference across the final filter, the pressure difference being generated by a suction of the compressor when the compressor is operating. The intermediate filter directly faces the final filter and a guard filter is installed downstream from the final filter.

According to another exemplary embodiment, there is a method of operating a filtering chamber configured to provide cleaned air to a compressor. The method includes removing or opening a first bypass port between a first chamber and a second chamber in the filtering chamber to reduce a pressure across a final filter, the final filter dividing the filtering chamber into the first chamber and the second chamber; removing or opening a second bypass port between the second chamber and an exterior of the filtering chamber; replacing the final filter; closing the second bypass port; and closing the first bypass port.

According to still another exemplary embodiment, there is a method of manufacturing a filtering chamber. The method includes separating the filtering chamber into a first chamber and a second chamber with a final filter stage; installing a first bypass port between the first chamber and the second chamber; and installing a second bypass port between the second chamber and the exterior of the filtering chamber, wherein an area of the second bypass port is larger than an area of the first bypass port.

According to yet another exemplary embodiment, there is a gas turbine system that includes a compressor configured to compress air; a combustor fluidly connected to the compressor and configured to receive the compressed air; a turbine connected to the combustor and configured to receive hot gases from the combustor for producing mechanical energy; and a filtering chamber connected to an inlet of the compressor and configured to clean the air provided to the compressor. The filtering chamber includes a first chamber in an inlet plenum having a first door and a prefilter installed in an intake port, the intake port being connected to an exterior of the filtering chamber, a second chamber in the inlet plenum, the second chamber being separated by an intermediate filter and a final filter from the first chamber and having a second door, and an air bypass mechanism configured to reduce a pressure difference across the final filter, the pressure difference being generated by a suction of the compressor when the compressor is operating. The intermediate fine filter directly faces the final filter and a guard filter is installed downstream from the final filter.

According to another exemplary embodiment, there is a method of operating a filtering chamber configured to provide cleaned air to a compressor. The filtering chamber includes an intermediate filter and a final filter dividing the filtering chamber into a first chamber and a second chamber. The method includes opening a first door, entering the first chamber; removing the intermediate filter to reveal the final filter; removing or opening a first bypass port between the first chamber and the second chamber in the filtering chamber to reduce a pressure across the final filter; opening a second bypass port between the second chamber and an exterior of the filtering chamber; opening a second door, entering the second chamber, and closing or leave it open the second door; replacing the final filter; opening the second door, exiting the second chamber, and closing the second door; closing the second bypass port; closing the first bypass port; reinstalling or replacing the intermediate filter to cover the replacement final filter; and opening the first door, exiting the first chamber, and closing the first door. The above steps take place while the compressor is online.

According to another exemplary embodiment, there is a filtering chamber configured to provide air to an inlet of a compressor. The filtering chamber includes a first chamber having a prefilter and an intermediate filter; a second chamber fluidly connected to the first chamber and having a guard filter; a final filter provided downstream the intermediate filter; and a blade provided in the second chamber and configured to rotate about a horizontal or vertical axis such that a first row or column of cells of the final filter are sealed between a frame and the blade. The blade is configured to reduce a pressure difference acting on the first row or column of cells when the filtering chamber is active.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 13A and 13B are flowcharts of another method for changing a final filter according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a filtering system for a compressor. However, the embodiments to be discussed next are not limited to these systems, but may be applied to other systems that require the supply of clean air.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
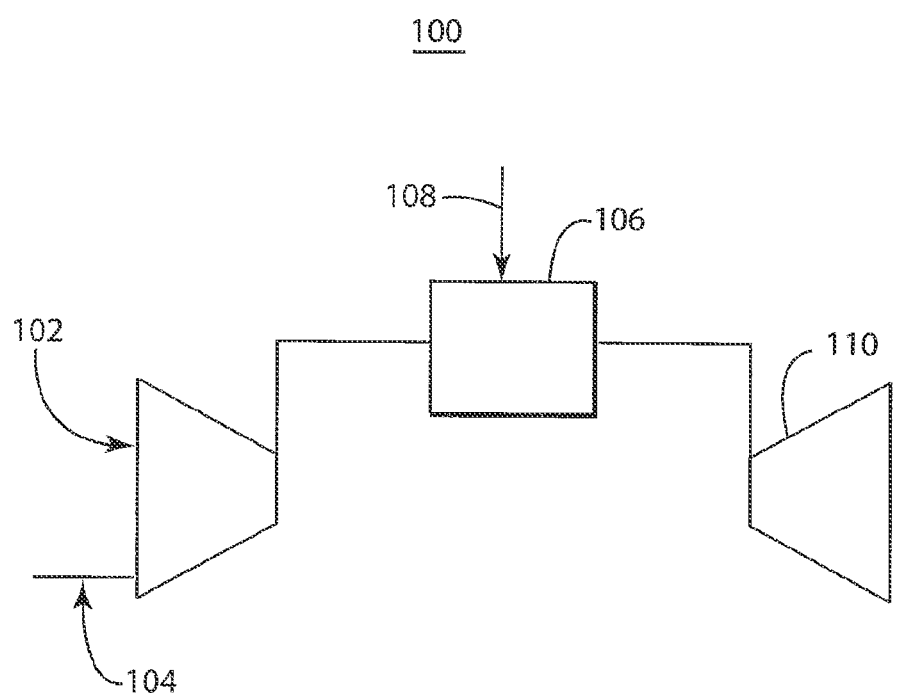
FIG. 1 is basic diagram of a gas turbine system.
Figure 2A:
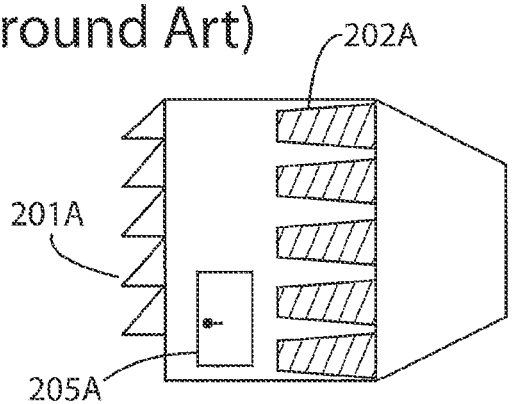
FIGS. 2A-2C are block diagrams of single, double and triple stage filter systems.
Figure 2B:
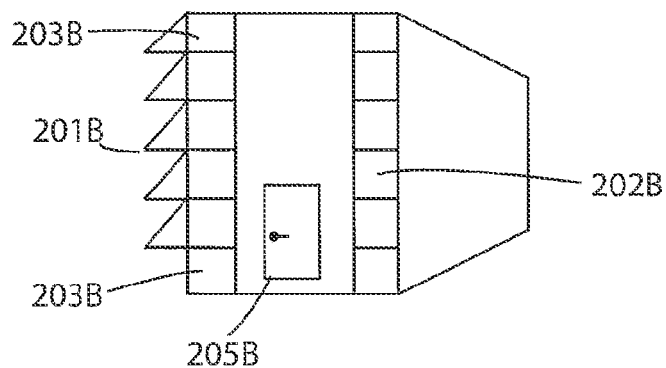
Figure 2C:
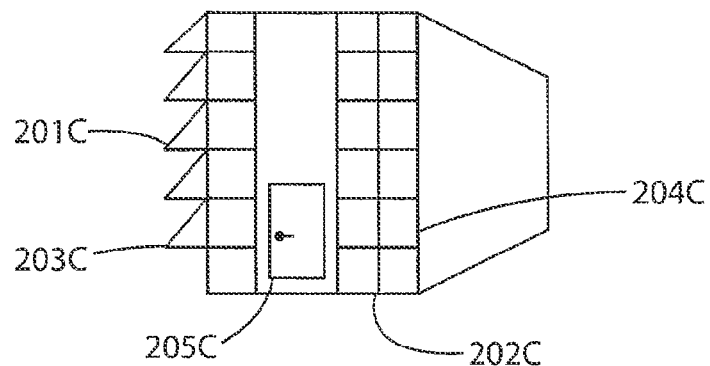
Figure 3A:
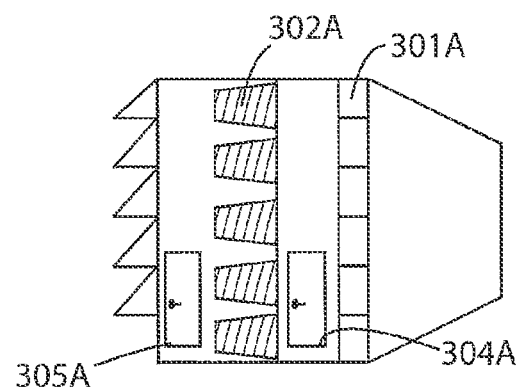
FIGS. 3A and 3B are block diagrams of single or double filter systems with a guard filter.
Figure 3B:
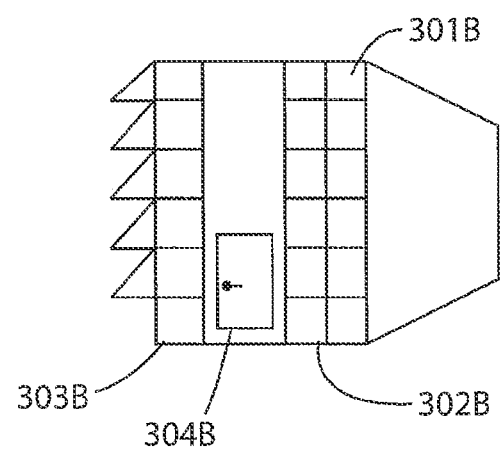
Figure 4:
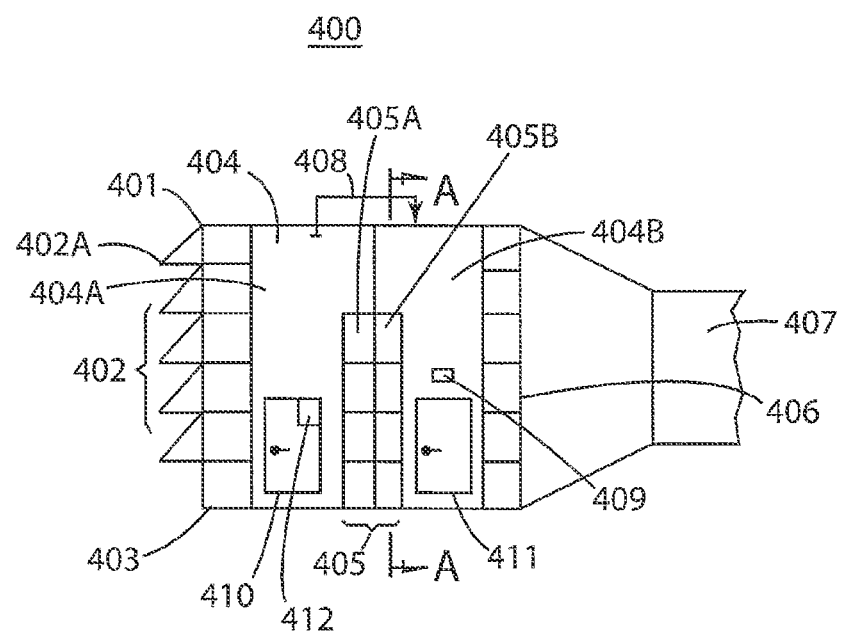
FIG. 4 is a block diagram of a filtering chamber according to an exemplary embodiment.

According to an exemplary embodiment, FIG. 4 shows a triple stage filter system having a guard filter. Those skilled in the art call such a system a quadruple stage filter system. In FIG. 4, there is a filtering chamber 400 that is configured to be connected via an intake duct 407 to an inlet of a compressor. The filtering chamber 400 is configured to hold the air filtering system. The filtering chamber 400 may have a weather protection system 402 on an exterior air intake port 401. The weather protection system might be configured as rain hoods with or without droplet catchers or as demister vane separators (also known as Marine Vane Separators)

Behind the weather protection system is a pre-filter 403. The pre-filter 403 includes one or more filter units (cells) that are designed to prevent debris or coarse parts of air contaminants from being sucked into the filter system. The pre-filter 403 is not a high quality filter. Typically, the pre-filter 403 will be replaced once its pressure drop reaches an established set point (e.g., 375 Pa). Depending of the particle distribution and nature of contaminants, the pre-filter 403 could reach the end of its operative life in a few months.

After the pre-filter 403, in an intake plenum 404, there is a dual filter assembly 405. The dual filter assembly includes an intermediate filter 405A and a final filter 405B. The intermediate filter 405A and the final filter 405B divide the intake plenum 404 into a first chamber 404A and a second chamber 404B. The intermediate filter 405A is configured to capture small articles that pass through the pre-filter 403. The intermediate filter 405A may be replaced once its pressure drop reaches an established set point (e.g., 650 Pa). Depending of the particle distribution and nature of contaminants this stage could reach the end of its operative life in about six months.

The final filter 405B is configured to capture even smaller particles that pass through the intermediate filter. The final filter 405B may be replaced once its pressure drop reaches an established set point (e.g., 650 Pa). This pressure difference makes almost impossible the manual removal of the final filter 405B while the gas turbine is online. In an exemplary embodiment, the intermediate filter 405A and the final filter 405B are configured to be accessed and replaced from the first chamber 404A. For this exemplary embodiment, the second chamber 404B is sealed by door 411. In one application, door 411 is bolted to the walls so that a high quality seal is maintained around door 411 given the fact that final filter 405B may be a very fine filter. In this application, the changing of the filters is performed by only using door 410. However, it is possible to also use door 411 as will be discussed later.

Downstream or behind the dual filter assembly 405 there is a guard filter 406. After the guard filter 406 there are no more filters prior to reaching the inlet of the compressor. The guard filter 406 is configured to capture large particles or objects that may be accidentally introduced, e.g., by the maintenance worker during maintenance of the intermediate filter 405A and final filter 405B. A low efficiency filter element is typically used as guard filter 406. In one embodiment, the guard filter 406 has the same construction or characteristics as pre-filter 403.

In the triple stage filter system of the current embodiment, access to the pre-filter 403, intermediate filter 405A and final filter 405B is via the first door or portal 410 between the exterior and the first chamber 404A. Access to the guard filter 406 is via the second door 411 located between the exterior and the second chamber 404B. It is also possible to access the final filter 405B and the intermediate filter 405A from the second chamber 404B. It is also possible to access the final filter 405B from the first chamber after the intermediate filter 405A is removed. In one embodiment, at least one of the first door 410 and the second door 411 open outward. In another embodiment, at least one of the first door 410 and the second door 411 open inward. The first door 410 and the second door 411 are sized to allow a human to enter and exit while carrying replacement filters and/or equipment. The filtering chamber 400 continues then to the intake duct 407. The intake duct 407 is configured to take the purified air to the inlet of the compressor. For this reason, the filtering chamber 400 does not have to be located directly on the compressor.

The first and second chambers 404A and 404B and corresponding filters shown in FIG. 4 may be repeated vertically over multiple floors. In one embodiment, the above described chambers are arranged into three floors, thus forming 6 chambers. In this embodiment, each of the 6 chambers has a corresponding door. In other embodiments, a different number of floors may be present. Access to the doors from the exterior is via exterior mounted stairs and platforms. The vertically stacked chambers may be separated by a solid floor or a grated floor.

In another embodiment, there may be one or more sets of 2 side-by-side first chambers and 2 side-by-side second chambers on a common floor (horizontal displacements of the chambers). Doors for the side-by-side chambers will be on opposite sides of the respective chambers.

Figure 11A:
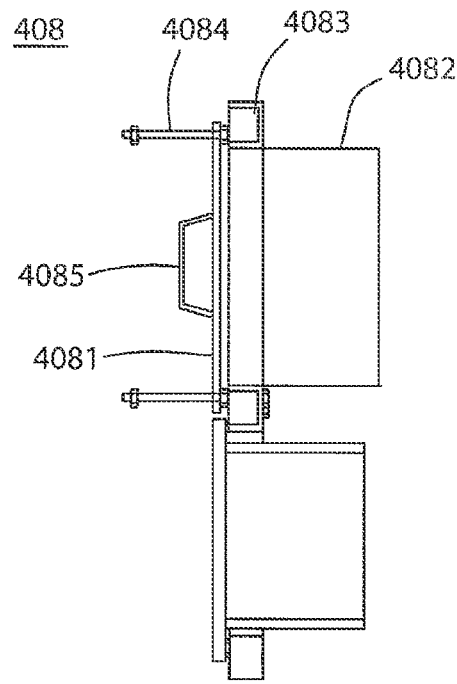
FIGS. 11A and 11B are diagrams of a first bypass port according to an exemplary embodiment.
Figure 11B:
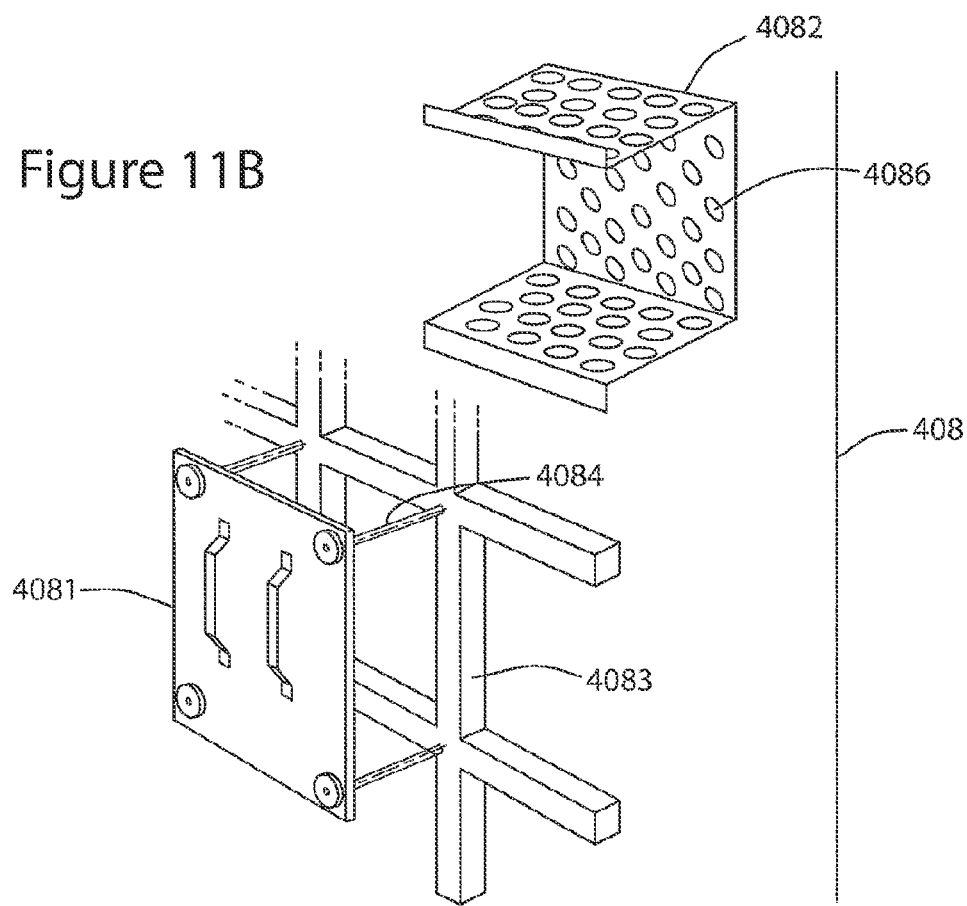

Also present is at least one first bypass port 408 configured to port air directly from the first chamber 404A to the second chamber 404B with no filters, thus reducing the suction force on the second door 411. The first bypass port 408 may be configured to open toward the first chamber or toward the second chamber. The first bypass port 408 may be configured as multiple ports to have an overall cross sectional area of approximately 1 to 2 $m^2$. However, different cross sectional areas may be used, so as to provide a desired pressure drop when opened. An example of a first bypass port 408 is shown in FIG. 11A. Here, port 408 includes a cover 4081 with at least a handle 4085 and fasteners. The cover 4081 is fastened to baffle 4082 through frame 4083. The first bypass 408 is preferably a bypass between the first chamber 404A and the second chamber 404B. However, the first bypass 408 may also be a port from the second chamber 404B to the outside. The port 408 may include guide rods 4084 for guiding the cover 4081. The baffle 4082 may be a perforated sheet with holes 4086 as shown in FIG. 11B or a screen. The open area of the baffle is configured to reduce a speed of the air flowing through the baffle as appropriate. FIG. 11B also shows the cover 4081 being opened.

The first bypass port 408 may be provided inside the filtering chamber 400. In one embodiment, by opening the first bypass port 408, a pressure difference across the final filter 405B may be reduced from about 650 Pa to about 200 Pa. In other embodiments, different pressure reductions may be obtained depending on the size of the first bypass port 408 and other factors. A goal of this embodiment is to introduce a first level of bypass as small possible in order to allow an operator to open a second bypass port 409. Because this first bypass "sacrifices" an active filtration area, it is desirable for this embodiment to minimize the size of the first bypass port 408.

Second bypass port 409 is configured to port air from the exterior of the filtering chamber 400 into the second chamber 404B between the final filter 405B and the guard filter 406, thus further reducing the pressure difference across the final filter 405B. In one embodiment, considering that the second bypass port 409 may have a cross sectional area of about 2 to 4 m², a pressure difference across the final filter 405B may be reduced to about 40 Pa. The cross sectional area of the second bypass may vary from the above noted numbers. With this small pressure difference, the filters of the final filter 405B may be easily removed by the operator from their frames. In other embodiments, different cross sectional areas may be used for second bypass port 409 to provide a desired pressure drop when opened.

Figure 12:
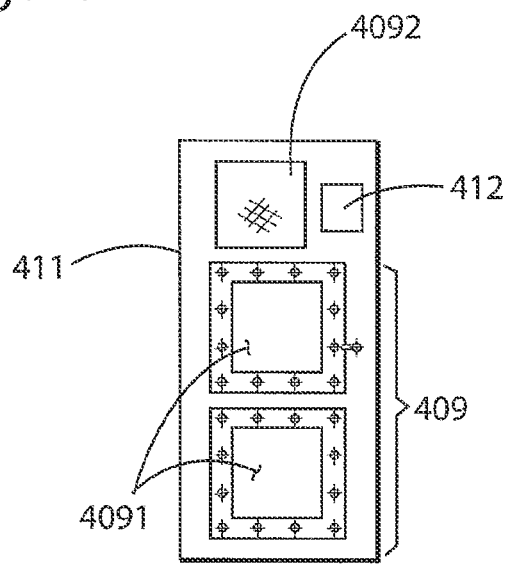
FIG. 12 is a diagram of a second bypass port according to an exemplary embodiment.

The second bypass port 409 may be configured to open inwardly or outwardly. The second bypass port 409 may include plural smaller ports that make the opening of the entire second bypass port 409 easier as a smaller force is present on each small port. The same may be true for the first bypass port 408. An example of a second bypass port 409 is shown in FIG. 12. Here, port 409 is installed in door (port 411) and includes one or more hatches 4091 that have handles and fasteners. An optional observation window 4092 may be included in door 411.

In another embodiment, it is possible to eliminate the first bypass port 408 and enlarge the second bypass port 409, which is ported to the atmosphere. In this case, the second bypass port 409 can be composed of a single bypass port or multiple smaller ports. In this embodiment, the second bypass port 409 can be manually actuated or servo driven.

In yet another embodiment, another bypass port 412 can be introduced to reduce a pressure across the final filter 405B and also to reduce a pressure difference across the first door 410, such that maintenance personnel is able to open the door for entering filtering chamber 400. That is, under some circumstances, the first bypass port 408 does not reduce the pressure across the final filter 405B enough for removing the final filter 405B. For this reason, bypass port 412 is placed to communicate with the second chamber to further reduce the pressure difference across the final filter 405B. As shown in FIGS. 4 and 12, the bypass port 412 may be placed in the door 411, next to the second bypass port 409.

Figure 5:
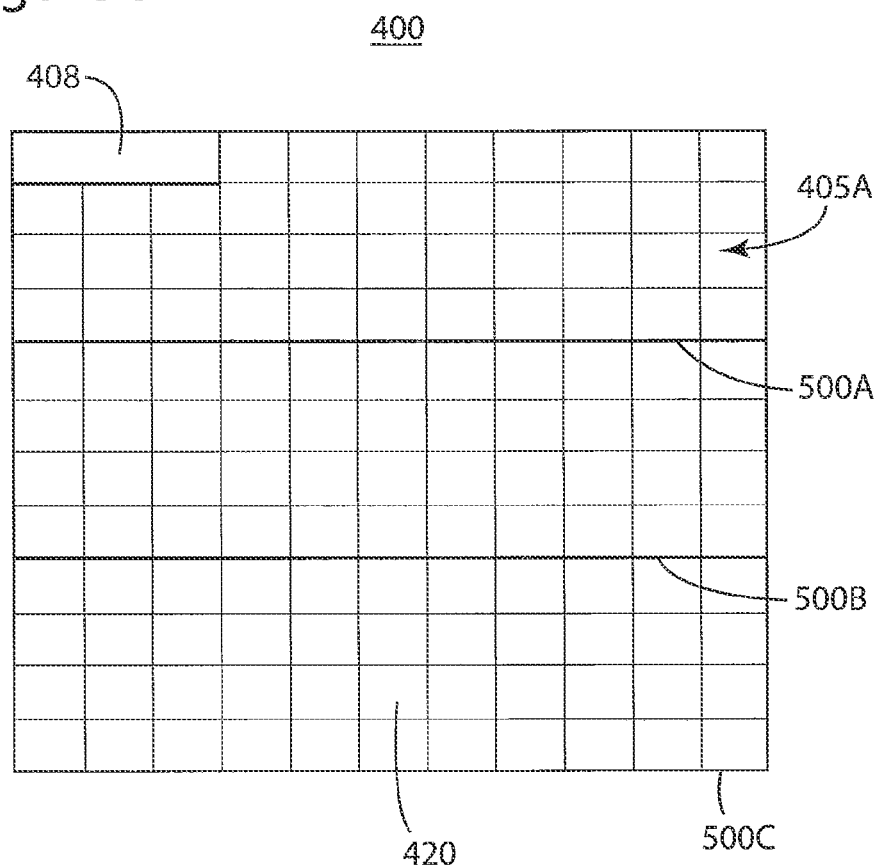
FIG. 5 is a block diagram of a final filter having plural cells according to an exemplary embodiment.

FIG. 5 shows a cross sectional cut of the filtering chamber 400 along line A-A. FIG. 5 shows that filtering chamber 400 has three floors 500A to 500C. The first bypass 408 is provided on a side on the third floor while the entire wall between the first chamber 404A and the second chamber 404B is covered with cells of the final filter 405B. In an exemplary embodiment, the final filter 405B includes between 100 and 200 cells 420, each being able to be replaced independent of the other cells. A cell may have a square shape with a size of a side about 0.5 m. The number of filters cells in final filter 405B and the position of the first bypass 408 can be customized case by case.

Figure 6:
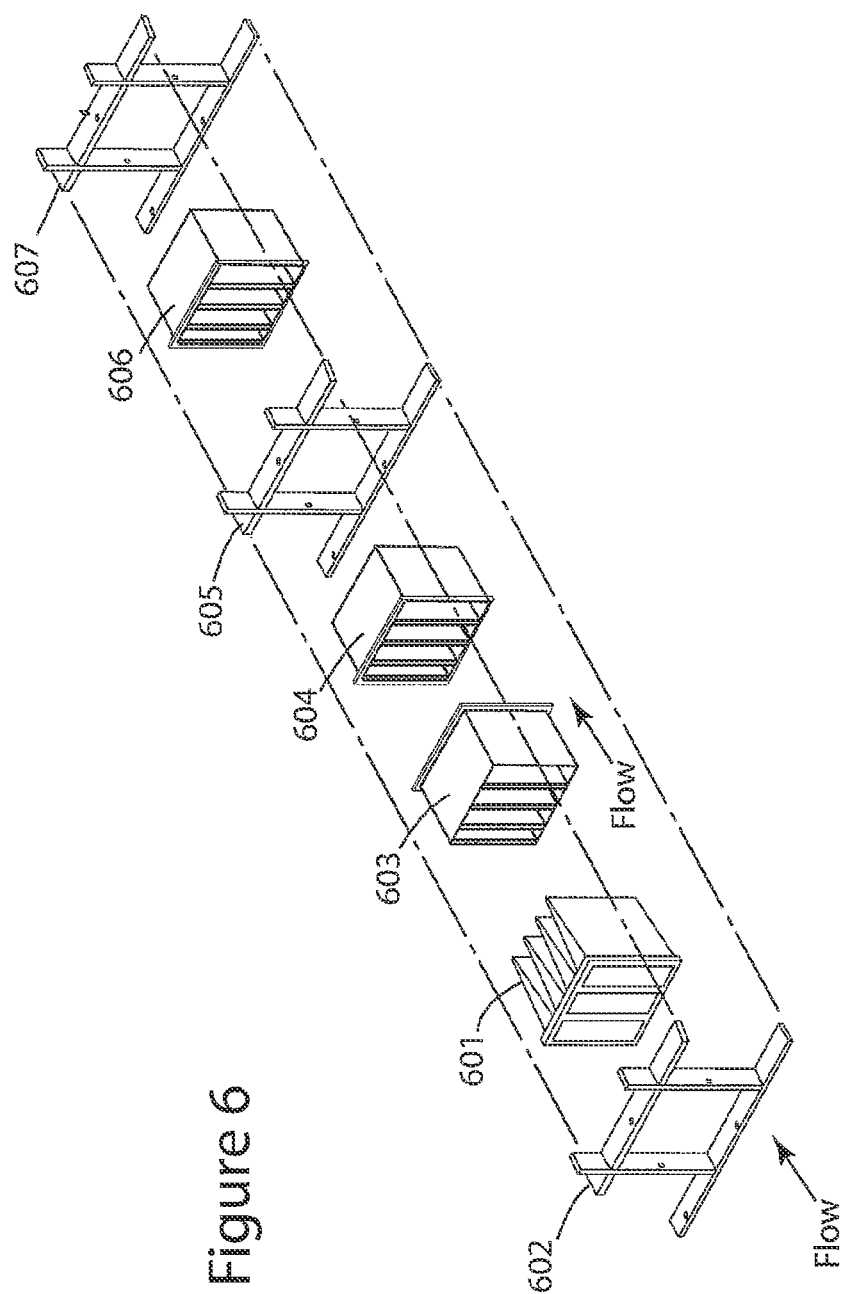
FIG. 6 is a diagram of a filter assembly according to an exemplary embodiment.

FIG. 6 is a diagram of a filter assembly according to an embodiment of the invention. Here, the pre-filter 601 is mounted into a first frame 602 that is attached to the filtering chamber 400. Also, the intermediate filter 603 and the final filter 604 may be mounted to a common second filter frame 605 that is attached to the filtering chamber 400. The intermediate filter 603 and the final filter 604 may be configured to face each other as shown in FIG. 6. Use of a common frame 605 between the intermediate filter 603 and the final filter 604 allows for a reduction in overall system size and may allow for easier system upgrades to existing systems. In one application, the intermediate filter 603 is in direct contact with the final filter 604. A gap may be left between the intermediate filter 603 and the final filter 604. The guard filter 606 is mounted into a third frame 607 that is also attached to the filtering chamber 400. The filters are mounted into the respective frames via retention fasteners designed to securely fasten and align the filters and to allow easy removal and replacement or via other known means in the art.

Figure 7:
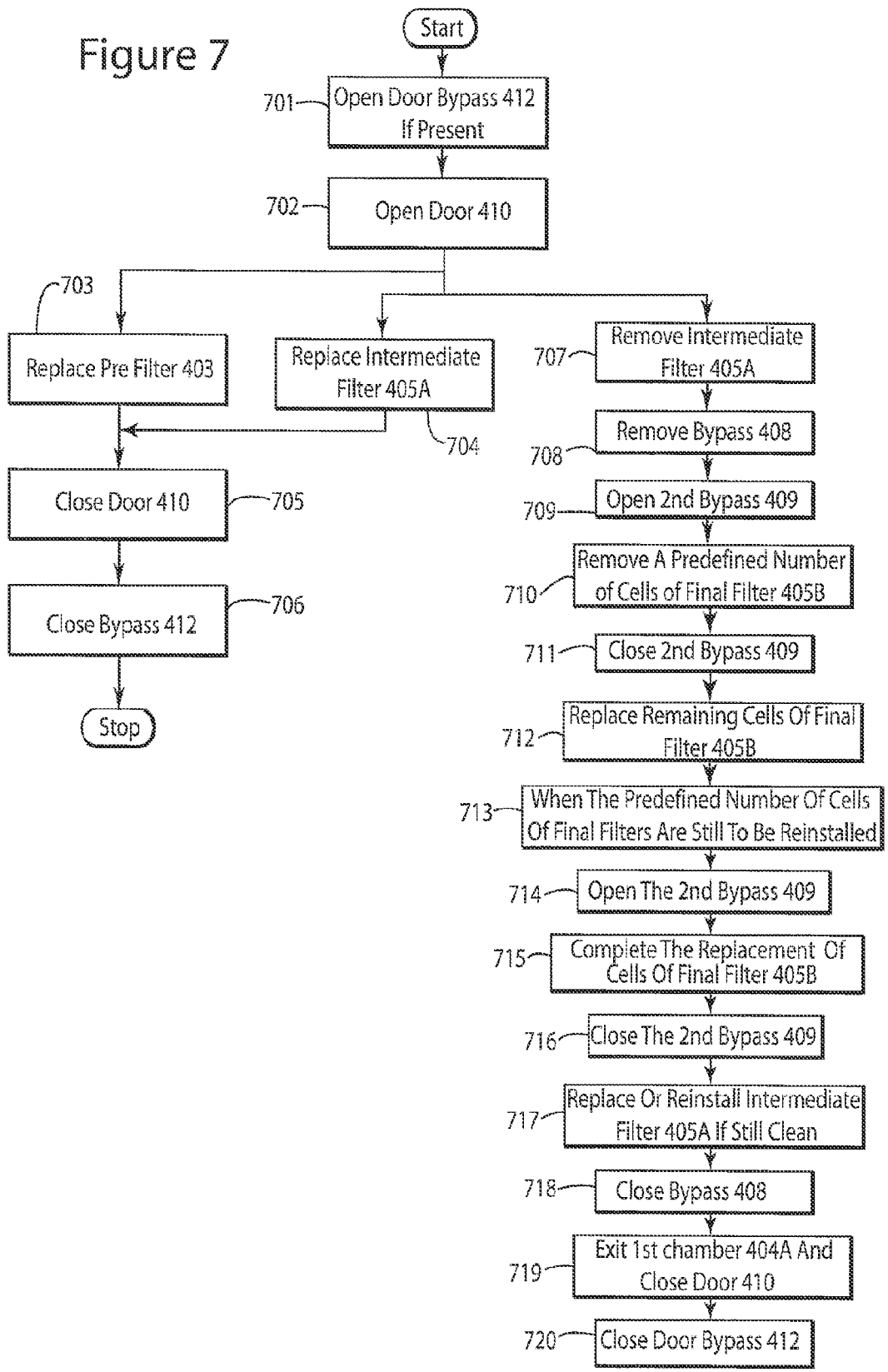
FIG. 7 is a flow chart illustrating a method for changing a final filter stage according to an exemplary embodiment.

FIG. 7 is a flow diagram describing a method of maintaining the filter assembly shown in FIG. 5 while the turbine is running (i.e., online) When it is determined that the final filter needs to be changed, the following process may be implemented. Maintenance personnel need to enter through door 410 into the first chamber 404A. Thus, the method begins with opening bypass 412 in step 701, if present. The opening of this port would reduce the pressure on the door 410. Next, door 410 is opened so the operator can enter first chamber 404A in step 702. If pre-filter 403 requires replacement, this filter is replaced in step 703. If intermediate filter 405A requires replacement, this filter is replaced in step 704. If final filter 405B does not require replacement, door 410 is closed in step 705, and bypass 412 is closed in step 706, and the process ends.

However, if final filter 405B requires replacement, intermediate filter 405A is first removed in step 707. Then bypass 408 is opened/removed in step 708. Then second bypass 409 is opened in step 709 so that a first number of cells of the final filter 405B can be removed in step 710. In step 710, the number of cells to be removed should be equivalent to an area equal to the second bypass 409. The exact number of cells to remove in step 710 is a function of the type of turbine downstream from the filters.

After the first number of cells of the final filter 405B is removed in step 710, the second bypass 409 is closed in step 711. Then the remaining cells (i.e., a second number) of the final filter 405B are replaced in step 712. Step 713 occurs when the second number of cells of the final filter 405B is replaced in step 712, but before the original first number from step 710 are replaced. Next, second bypass 409 is re-opened in step 714. While second bypass 409 is open, the remaining filter cells (i.e., the first number of cells) are replaced in step 715. After the final cells are replaced in step 714, the second bypass 409 is closed in step 716. Next, the intermediate filter 405A is either reinstalled (if clean) or replaced with a new filter in step 717. Then, bypass 408 is closed in step 718. Then, the first operator exits first chamber 404A and closes door 410 in step 79, and bypass 412 (if present) is closed in step 720. It is noted that the operator does not have to open door 411 or to enter the second chamber 404B for this operation.

Note that in the preceding method, the cells of the final filter 405B are removed from the first chamber 404A, and not from the second chamber 404B. It is preferred that door 411 is not be opened while the compressor is running. However, if there is a problem removing cells of the final filter 405B from first chamber 404A, an operator can enter the second chamber 404B to work.

However, in another embodiment, one operator may enter the first chamber 404A while a second operator enters the second chamber 404B. The second operator then covers a cell of the final filter 405B with a box so that the differential pressure across this cell is zero. Thus, the first operator in the first chamber is able to extract the corresponding cell from the first chamber 404A. This is repeated for some or all of the cells, until enough cells are removed to provide a bypass similar to step 710 in FIG. 7. In this embodiment, the operator in the first chamber will have already extracted the intermediate filter prior to opening any bypass. In this embodiment, the first bypass 408 may or may not be present. Also, the second bypass 409 may or may not be present.

In this embodiment, to be able to open the second door 411 while the compressor is running and creating a large suction, a mechanical device may be used to act on or otherwise open the door 411. For example, the bypass port 412 is helpful for this situation.

In still another exemplary embodiment, no box is placed over the suction side of the cell. Instead, the second operator in the second chamber pushes the cell while and the first operator pulls the same cell so the cell moves into the first chamber 404A.

Figure 8:
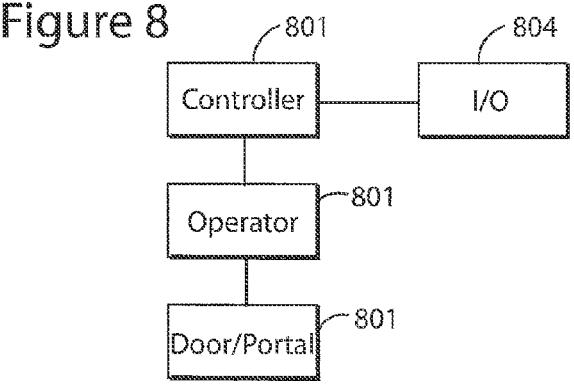
FIG. 8 is a block diagram of a control module according to an exemplary embodiment.

In each of the preceding embodiments, there may be one or more pressure gauges in or near the above-described doors and/or filters to indicate the differential pressure on opposite sides of the doors. Also, one or more of the doors and/or bypass ports may be operated manually or electro-mechanically, with or without hydraulic or pneumatic assistance. Also, one or more of the doors and/or bypass ports may include gaskets or other devices for preventing air to pass when the doors and/or bypass ports are closed. The ports may be opened or closed automatically with the above noted means. In this regard, FIG. 8 shows a controller 801 (e.g., microprocessor) operatively connected to a hydraulic or pneumatic or electro-mechanical operator 802 that is operatively connected to at least one door or portal 803 for opening or closing the door. The portal 803 may be one of the doors 410 and/or 411 or port 412 shown in FIG. 4. The controller 801 may be connected to an input/output interface 804 through which the maintenance personnel may open or close the portal. The interface 804 may be provided outside or inside the filtering chamber 400. In one application, part of the interface 804 may be provided outside the filtering chamber 400 and the remaining part inside the filtering chamber 400.

Figure 9:
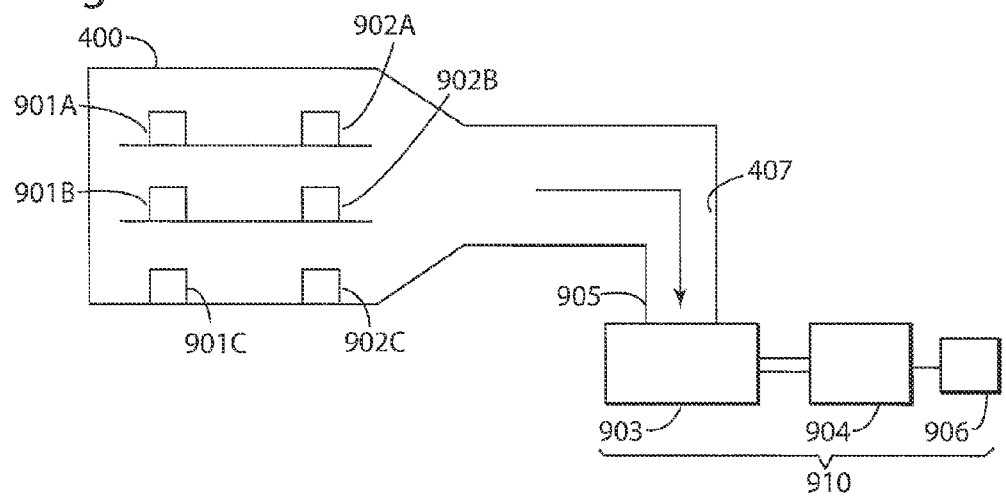
FIG. 9 is a block diagram of a filtering chamber having plural floors according to an exemplary embodiment.

As noted previously and as shown in FIG. 9, the above described embodiments may be repeated in multiple floors (here 3 floors) with corresponding first doors 901A/901B/901C and second doors 902A/902B/902C for the first and second chambers and the intake duct leading to an inlet 905 of a compressor 903 which provides air to a combustor 904. FIG. 9 also shows that the combustor 904 is connected to a turbine 906. The compressor 904, the combustor 904 and the turbine 906 form the gas turbine system 910.

Figure 10:
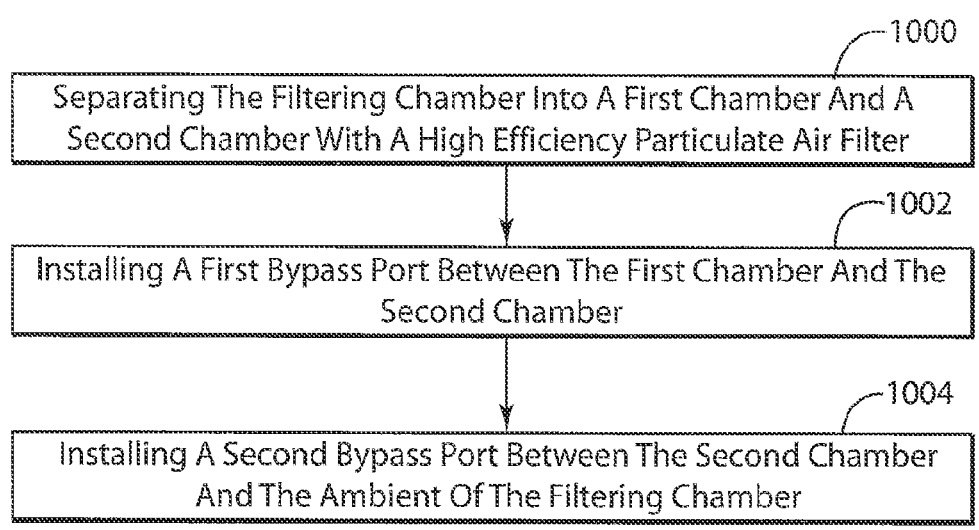
FIG. 10 is a flow chart illustrating a method for manufacturing a filter assembly according to an exemplary embodiment.

According to an exemplary embodiment illustrated in FIG. 10, there is a method of manufacturing a filtering chamber 400. The method includes a step 1000 of separating the filtering chamber into a first chamber and a second chamber with a final stage (which may be a high efficiency particulate air, e.g., HEPA or EPA filter); a step 1002 of installing a first bypass port between the first chamber and the second chamber; and a step 1004 of installing a second bypass port between the second chamber and the ambient of the filtering chamber. An area of the second bypass port is larger than an area of the first bypass port.

FIGS. 13A and 13B illustrate a flowchart describing methods for operating a filtering chamber when the second door 411 is used as described in two previous embodiments discussed above. Steps 1301-1306 are the same as in FIG. 7. Again, if the final filter 405B requires replacement, intermediate filter 405A is first removed in step 1307. Then bypass 408 (if present) is removed in step 1302. Before or after step 1308, the second operator opens door 411, enters second chamber 404B, and closes door 411 in step 1309 or leave it open. Step 1309 may include opening second bypass 409 (if present) in step 1309A. Optionally, a first number of cells of final filter 405B can be removed in step 1310. Step 1310 includes either step 1310A (the second operator placing a cover on the cells before removal) or step 1310B (the second operator pushing the cells while the first operator pulls the cells). In step 1310, the number of cells to be removed may be equivalent to an area equal to the optional second bypass 409. The exact number of cells to remove in step 1310 is a function of the type of turbine downstream from the filters. After the first number of cells of final filter 405B is removed in step 1310, optional second bypass 409 is closed in step 1311. Then the remaining cells (i.e., a second number) of final filter 405B are replaced in step 1312. Step 1312 may or may not include either step 1312A (the second operator placing a cover on the cells before removal) or step 1312B (the second operator pushing the cells while the first operator pulls the cells).

Step 1313 occurs when the second number of cells of final filter 405B is replaced in step 1312, but before the original first number from step 1310 are replaced. Next, optional second bypass 409 is re-opened in step 1314. While optional second bypass 409 is open, the remaining cells (i.e., the first number of cells) are replaced in step 1315. After the final cells are replaced in step 1315, optional second bypass 409 is closed in step 1316.

Returning to step 1309, it is noted that another possible approach for changing the final filter may follow the following steps. In step 1309-1, which is performed instead of step 1310, an operator may place a cover box over the final filter 405B, from the second chamber 404B. Then, in step 1309-2, the covered cells (e.g., a first row or column) may be removed so that a pressure difference across the final filter is reduced. Under these circumstances, the remaining cells of the final filter may be removed or replaced in step 1309-3. What is left is to insert new cells for the cells removed in step 1309-2. To be able to perform this step, the empty space left by those cell removed in step 1309-2 is covered with the cover box in step 1309-4 and the new cell are inserted in place in step 1309-5. After this, when all the cells of the final filter 405B are in place, the bypass 409 is closed in step 1309-6 and the method proceeds to step 1317.

Next, intermediate filter 405A is either reinstalled (if clean) or replaced with a new filter in step 1317. Then, optional bypass 408 is closed in step 1318. Before or after steps 1317 and 1318, the second operator opens door 411, exits second chamber 404B, and closes door 411 in step 1319. Then, the first operator exits first chamber 404A and closes door 410 in step 1320, and bypass 412 (if present) is closed in step 1321.

Figure 14:
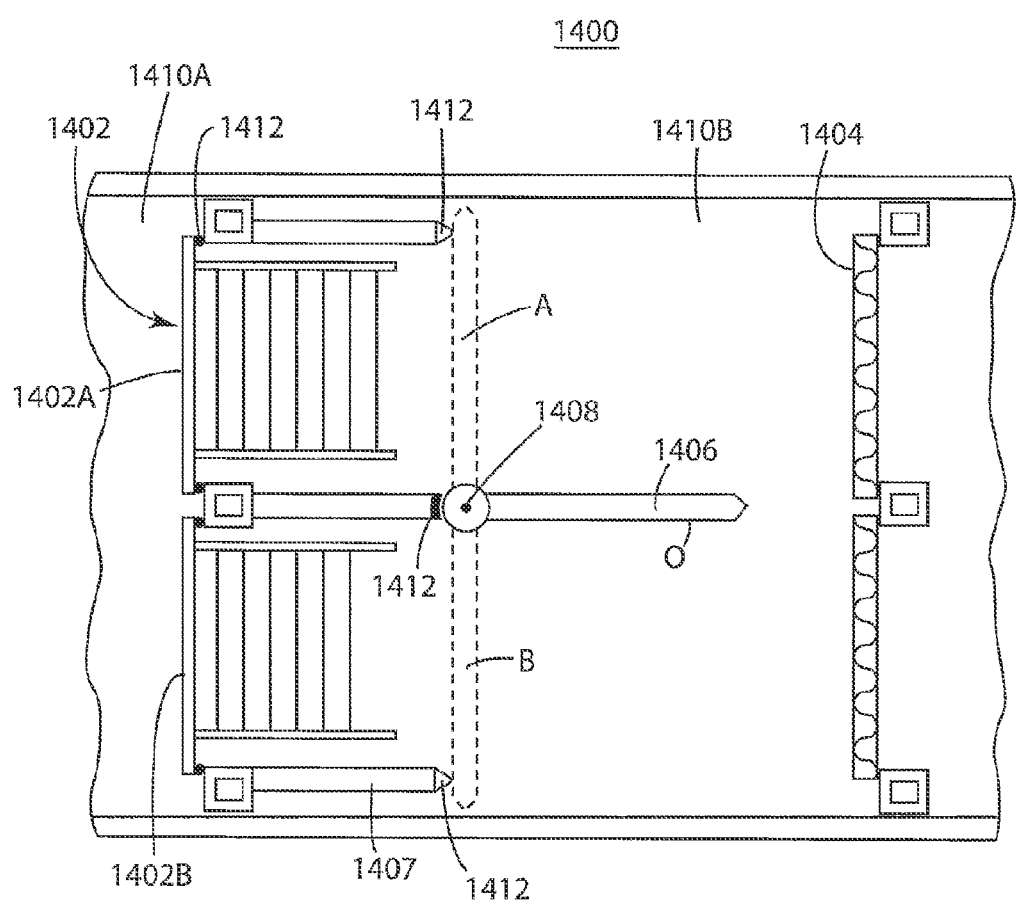
FIG. 14 is a diagram of a filtering chamber having a movable blade according to an exemplary embodiment.

According to another exemplary embodiment illustrated in FIG. 14, the filters inside the filtering chamber may be changed/removed without using the first and second bypass ports discussed above with regard to FIG. 4. As shown in FIG. 14, the filtering chamber 1400 includes, among other elements, a final filter 1402 and a guard filter 1404. The other filters, e.g., prefilter and intermediate filter are not shown as they are similar to those shown in FIG. 4. The final filter 1402 is shown (for simplicity) in the figure having only two rows 1402A and 1402B of cells. However, the final filter has more rows of cells. FIG. 14 also shows a blade 1406 attached to a fixed point 1408 inside the filtering chamber 1400. In one application, the fixed point 1408 is positioned between the first row 1402A and the second row 1402B. In another application, the blade may be provided between a first column and a second column of cells, i.e., to rotate along a vertical axis instead of a horizontal axis.

The blade 1406 is configured to rotate relative to a shaft entering into the page (e.g., horizontal axis), in FIG. 14, at point 1408. Alternatively, the blade 1406 may slide from one position to another.

The blade 1406 may move to position A to seal the first row 1402A of cells so that a pressure difference across these cells is reduced to substantially zero. The blade 1406 seals a frame 1407. Thus, when the blade 1406 is in position A, the corresponding cells may be easily removed from a first chamber 1410A (which corresponds to chamber 404A in FIG. 4). Then, the blade 1406 may be moved to position B to seal the cells of row 1402B and these cells may be removed. Having removed a predetermined number of cells of the final filter 1402, the remaining cells may be replaced similar to the method described in FIG. 7.

Figure 15:
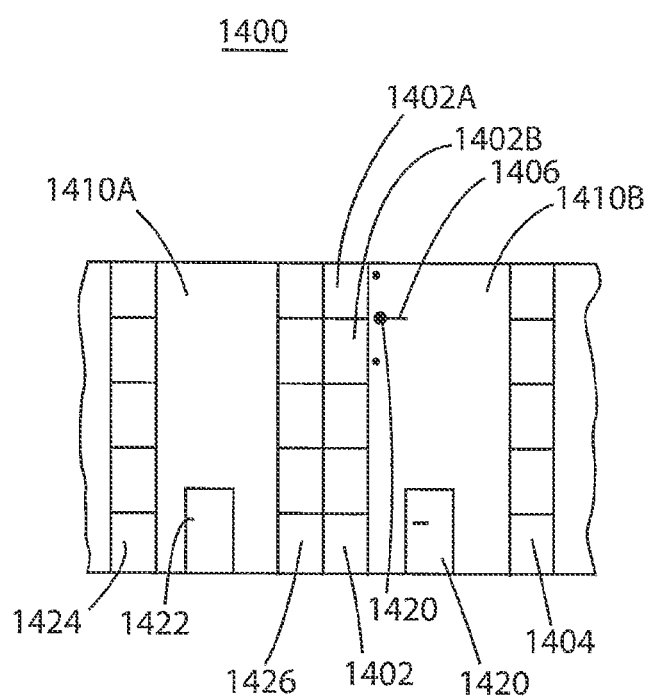
FIG. 15 is an overall view of the filtering chamber with the movable blade according to an exemplary embodiment.

For achieving a large reduction in the pressure across the cells of rows 1402A and B, seal elements 142 may be used. Blade 1406 is sized to cover enough cells for allowing the extraction of the remaining cells. Although FIG. 14 shows the blade moving from a neutral position O to positions A and B, it is possible that the blade moves from the neutral position only to one of positions A and B. The position change of blade 1406 may be achieved by an operator manually rotating the blade or by a mechanical or electro-metrical or pneumatic device acting on the blade. Such a device is shown as 1420 in FIG. 15. This figure also shows more than two rows of cells for the final filter 1402, a door 1420 corresponding to the second chamber 1410B, a door 1422 corresponding to the first chamber 1410A, a prefilter 1424, and an intermediate filter 1426. In one application, the blade 1406 is positioned at a top of the second chamber 1410B so that the operation of the blade does not interfere with the presence of an operator inside the second chamber. The blade 1406 may be operated from outside the filtering chamber 1400, from inside the chamber or from both locations. The blade may be, for example, five cell elements long.

Figure 16:
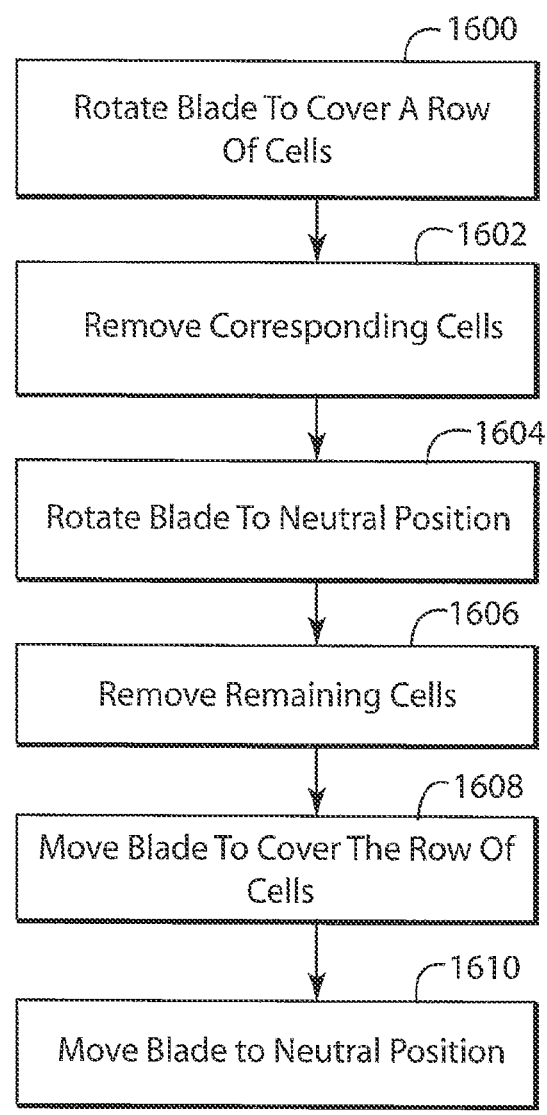
FIG. 16 is a flowchart of a method for operating a filtering chamber having a movable blade according to an exemplary embodiment.

According to an exemplary embodiment illustrated in FIG. 16, the blade 1406 may be operated in the following way. In a step 1600, the blade is rotated from position O to position A, manually or automatically while the compressor is active. The blade, that can be single or done by multiple sub blades, seals against the frame and blocks the flow through the final filter cells on that row. There may be multiple blades installed (e.g., one for each maintenance level) to allow for removing enough filter cells to reduce the pressure drop up to a level that allows for easy replacement of all other final filter cells. Thus, in step 1602, an operator may remove the sealed cells of the final filter. If more cells are necessary to be removed, the blade is moved to position B to seal another row of cells of the final filter. Then, in step 1604, the blade is moved to the neutral position O for allowing the air to flow directly from the first chamber to the second chamber. The flow through the opening created on the two rows does not disturb the operator as the flow is high above the maintenance level. In step 1606 the remaining cells of the final filter are removed, replaced or changed as the pressure drop across the final filter is small enough. This sequence is run in the opposite direction when the last cells of the final filter have to be replaced, i.e., close blade in step 1608 to place the new cells corresponding to the blade and bring the blade in the neutral position in step 1610.

By providing the novel filtration chamber discussed above, it is possible to change all the filters while the compressor is online, thus, reducing a down time of the gas turbine. Further, because of the presence of the high efficiency final filter, the guard filter might not need to be changed for a long period of time allowing its maintenance to be made during a gas turbine overhaul maintenance period. When an axial compressor is used, its efficiency is increased when the very efficient final filter stage, as an EPA or HEPA, is present. It is also possible to avoid axial compressor efficiency decrease due to fouling and so avoid consequent gas turbine power loss and a heat rate increase by using the above novel exemplary embodiments. Also, it is possible to retrofit exiting filter systems based on the above disclosure. The arrangement of the high efficiency filter and final filter (HEPA or EPA) in face to face arrangement allows saving space for the installation of an additional 4 stage (guard filter). This arrangement might allow re-using the same frames or foundations of an existing filter with single or dual stage filter. The previously described embodiments may be adapted to turbines/compressors of any rating. Thus, the described sizes and pressure values are exemplary. Different sizes may be used when adapting the current invention to turbines/compressors of a specific rating.

The disclosed exemplary embodiments provide a system and a method for changing online a final filter. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A filtering chamber configured to provide air to an inlet of a compressor, the filtering chamber comprising:
- a first chamber in an inlet plenum, the first chamber comprising a first door and a prefilter installed in an intake port, the intake port being connected to an exterior of the filtering chamber;
- a second chamber in the inlet plenum, the second chamber being separated by a intermediate filter and a final filter from the first chamber, and comprising a second door; and
- an air bypass mechanism configured to reduce a pressure difference across the final filter, the pressure difference being generated by a suction of the compressor when the compressor is operating,
- wherein the intermediate filter directly faces the final filter and a guard filter is installed downstream from the final filter.

2. The filtering chamber of claim 1, wherein the air bypass mechanism comprises:

a first bypass port connecting the first chamber and the second chamber to each other.

3. The filtering chamber of claim 2, wherein an area of the first bypass port is between 1 and 2 m².

4. The filtering chamber of claim 3, wherein the final filter cannot be extracted when the compressor is working and the first bypass port is open.

5. The filtering chamber of claim 2, wherein the air bypass mechanism further comprises:
a second bypass port connecting the second chamber to the exterior of the filtering chamber.

6. The filtering chamber of claim 5, wherein an area of the second bypass port is larger than an area of the first bypass port.

7. A gas turbine system, comprising:
a compressor configured to compress air;
a combustor fluidly connected to the compressor and configured to receive the compressed air;
a turbine connected to the combustor and configured to receive hot gases from the combustor for producing mechanical energy; and
the filtering chamber according to claim 1, wherein the filtering chamber is connected to an inlet of the compressor, and is configured to clean the air provided to the compressor.

8. A method of operating a filtering chamber configured to provide cleaned air to a compressor, the method comprising:
removing or opening a first bypass port between a first chamber and a second chamber in the filtering chamber to reduce a pressure across a final filter, the final filter dividing the filtering chamber into the first chamber and the second chamber;
removing or opening a second bypass port between the second chamber and an exterior of the filtering chamber;
replacing the final filter;
closing the second bypass port; and
closing the first bypass port,
wherein the above steps take place while the compressor is online.

9. The method of claim 8, wherein the filtering chamber comprises an intermediate filter and a final filter dividing the filtering chamber into the first chamber and the second chamber, the method further comprising:
opening a first door, entering the first chamber;
removing the intermediate filter to reveal the final filter;
opening a second door, entering the second chamber, and closing or leave it open the second door;
opening the second door, exiting the second chamber, and closing the second door;
reinstalling or replacing the intermediate filter to cover the replacement final filter; and
opening the first door, exiting the first chamber, and closing the first door,
wherein the above steps take place while the compressor is online.

10. The method of claim 8, wherein the filtering chamber comprises an intermediate filter and a final filter dividing the filtering chamber into the first chamber and the second chamber, the method further comprising:
before removing or opening a first bypass port:
opening a first door, entering the first chamber; and
removing the intermediate filter to reveal the final filter;
after opening the second bypass port:
opening a second door, entering the second chamber, and closing or leave it open the second door;
after replacing the final filter:
opening the second door, exiting the second chamber, and closing the second door; and
after closing the first bypass port:
reinstalling or replacing the intermediate filter to cover the replacement final filter; and
opening the first door, exiting the first chamber, and closing the first door,
wherein the above steps take place while the compressor is online.

11. A filtering chamber configured to provide air to an inlet of a compressor, the filtering chamber comprising:
a first chamber comprising a prefilter and an intermediate filter;
a second chamber fluidly connected to the first chamber, and comprising a guard filter;
a final filter provided downstream the intermediate filter; and
a blade provided in the second chamber, and configured to rotate about a horizontal axis or a vertical axis such that a first row or a first column of cells of the final filter are sealed between a frame and the blade,
wherein the blade is configured to reduce a pressure difference acting on the first row or the first column of cells when the filtering chamber is active.

* * * * *